(12) United States Patent
Ezrielev et al.

(10) Patent No.: US 11,714,834 B2
(45) Date of Patent: Aug. 1, 2023

(54) DATA COMPRESSION BASED ON CO-CLUSTERING OF MULTIPLE PARAMETERS FOR AI TRAINING

(71) Applicant: Dell Products L.P., Round Rock, TX (US)

(72) Inventors: Ofir Ezrielev, Be'er Sheva (IL); Nadav Azaria, Meitar (IL); Avitan Gefen, Tel Aviv (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 17/581,127

(22) Filed: Jan. 21, 2022

(65) Prior Publication Data

US 2023/0125308 A1    Apr. 27, 2023

Related U.S. Application Data

(63) Continuation-in-part of application No. 17/509,759, filed on Oct. 25, 2021.

(51) Int. Cl.
*H03M 7/00* (2006.01)
*G06F 16/28* (2019.01)
*G06N 20/00* (2019.01)

(52) U.S. Cl.
CPC .......... *G06F 16/285* (2019.01); *G06N 20/00* (2019.01)

(58) Field of Classification Search
CPC .............................. G06F 16/285; G06N 20/00
See application file for complete search history.

(56) References Cited

U.S. PATENT DOCUMENTS

| | | | |
|---|---|---|---|
| 8,266,147 B2* | 9/2012 | Slezak | G06F 16/285 |
| | | | 707/769 |
| 2017/0124478 A1* | 5/2017 | Baradaran | H04L 63/1425 |
| 2018/0197089 A1* | 7/2018 | Krasser | G06N 20/10 |

(Continued)

OTHER PUBLICATIONS

Varghese, B. et al., "Challenges and Opportunities in Edge Computing", Proceedings of the IEEE International Conference on Smart Cloud (IEEE SmartCloud), 2016.

(Continued)

*Primary Examiner* — Jean B Jeanglaude
(74) *Attorney, Agent, or Firm* — Jackson Walker L.L.P.

(57) ABSTRACT

Co-clustering of at least some parameters is employed to reduce data transferred between edge and cloud resources. Single-parameter cluster information, including cluster counts, for each of two or more parameters of interest is accessed. Each parameter may represent a time series of numeric values sent from an IoT unit to an edge device. A co-clustering ratio is determined for each unique parameter pair. The co-clustering ratio indicates whether the number of clusters produced by a co-clustering algorithm applied to a group of parameters is less than the number of clusters required to represent the parameters without co-clustering. Co-cluster groups may be identified based on the cluster ratios. For each co-cluster group, the co-clustering algorithm may be invoked to produce compressed encodings of numeric value tuples. The compressed encoding is then transmitted to a cloud computing resource and decoded into a tuple of surrogate values.

20 Claims, 6 Drawing Sheets

(56) References Cited

U.S. PATENT DOCUMENTS

2019/0220703 A1* 7/2019 Prakash ............... G06V 10/95
2019/0273509 A1* 9/2019 Elkind ............... H03M 7/4093

OTHER PUBLICATIONS

Kingma, Diederik P. et al., "Auto-encoding variational bayes", arXiv preprint arXiv:1312.6114, 2013.

Baraniuk, Richard G. et al., "Model-Based Compressive Sensing", IEEE Transactions on Information Theory 56.4, pp. 1982-2001, 2010.

Biswas, Aniket et al., "A New Method for Constructing Continuous Distributions on the Unit Interval", arXiv preprint arXiv:2101.04661, 2021.

* cited by examiner

DATA COMPRESSION BASED ON CO-CLUSTERING OF MULTIPLE PARAMETERS FOR AI TRAINING

TECHNICAL FIELD

The present disclosure relates to distributed computing systems and, more particularly, performance within edge computing environments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Information handling systems encompass distributed systems comprising two or more networked information handling resources, including hardware and software resources, interacting in the processing, storing, and/or communicating of information. Edge computing is an important and expanding example of a distributed system. In an edge computing environment, edge devices aggregate data from internet of thing (IoT) units and relay the information to centralized cloud computing resources. In at least some distributed systems, including at least some edge computing environments, user satisfaction is highly correlated to adequate performance including, as non-limiting examples, stable and reliable data transfer rates exceeding a particular data transfer threshold and stable and reliable latency below a specified latency threshold.

SUMMARY

Common problems associated with performance constraints within edge computing environments and other distributed systems are addressed by compressed encoding methods and systems that employ co-clustering for at least some parameters of interest. In one aspect, a disclosed method accesses single-parameter cluster information for each of two or more parameters of interest. Each parameter of interest may correspond to a time series of numeric values sent from one or more internet of things (IoT) units to an edge device. The single-parameter cluster information for each parameter of interest indicates a single-parameter cluster count for the parameter of interest. The method may then determine a co-clustering ratio for each parameter pair, i.e., each unique pair of the parameters of interest. Each parameter pair includes a first parameter and a second parameter and the co-clustering ratio indicates whether the number of clusters produced by a co-clustering algorithm applied to the first and second parameters is less than the number of clusters associated with single-parameter clustering of the first and second parameters. The co-clustering algorithm may be a density based spatial cluster application with noise (DBSCAN) algorithm.

Mathematically, the cluster ratio may be defined as $(C1*C2)/CC$, where $C1$ is the cluster count associated with the single-parameter clustering of the first parameter, $C2$ is the cluster count associated with the single-parameter clustering of the second parameter, and $CC$ is the cluster count associated with a co-clustering of the first and second parameters performed by a co-clustering algorithm.

Based at least in part on the cluster ratios, disclosed methods may identify one or more groups of parameters that may be beneficially co-clustered, wherein each such co-cluster groups includes two or more parameters of interest. For each co-cluster, the co-clustering algorithm may be invoked to produce compressed encodings of numeric value tuples that include a numeric value for each parameter in the co-cluster group.

The co-clustering algorithm may assign each numeric value tuple associated with a co-cluster group to one of a plurality of clusters and the compressed encodings may include an identifier of the cluster. In at least one embodiment, the compressed encoding is an integer value that identifies the cluster to which the co-clustering algorithm assigns the numeric value tuple. The compressed encodings are then transmitted to a cloud computing resource in lieu of transmitting each of the tuple's numeric values. For a co-cluster group comprised of two parameters, this technique would transmit a single, n-bit integer value where n, in at least some cases, may be in the range between 2 and 8, to represent the two numeric values in the tuple. For co-cluster groups of more than 2 parameters, the improvement in data transmission efficiency, i.e., the reduction in the amount of data transmitted from edge to cloud, would be even greater.

When a decoder in the cloud receives a compressed co-clustered encoding associated with a particular co-cluster group, the decoder may generate surrogate numeric values for each parameter in the co-cluster group in accordance with a probability distribution of the particular parameter pair. The surrogates may then be forwarded as training data to an artificial intelligence engine of the cloud computing resource.

Identifying co-cluster groups to which co-clustering may be beneficially applied may include accessing information indicative of a node and edge graph associated with the parameters of interest, wherein the node and edge graph includes a node corresponding to each parameter of interest and an edge connecting each distinct parameter pair. A cluster ratio may be calculated for and assigned to each edge of the graph. In at least one embodiment, the cluster ratio is a fraction in which the numerator is determined by multiplying the single-parameter cluster count of each parameter in the parameter pair and the denominator is equal to the cluster count produced for the parameter pair by the co-clustering algorithm. Example: The cluster ratio for a parameter pair comprised of parameter 1 and parameter 2 is equal to $(C1*C2)/CC$, where $C1$ is the cluster count of a single-parameter clustering of the first parameter, $C2$ is the cluster count for a single-parameter clustering of the single-parameter clustering algorithm, and $CC$ is the cluster count for a co-clustering of parameter 1 and parameter 2 generated by the co-clustering algorithm.

The determination of co-cluster groups may include modifying the node and edge graph by removing edges with a cluster ratio below a particular threshold ratio to produce a modified graph. The modified graph may then be analyzed to identify maximal cliques and/or maximum cliques. If the modified graph includes a single maximal clique, then the nodes defining this clique may be the sole co-cluster group. If the modified graph includes multiple maximal cliques and/or maximal cliques of different sizes (i.e., different node counts), then various alternatives may be employed to identify the co-cluster groups as described in more detail below with respect to FIG. 5 through FIG. 7. In some embodiments, whenever a node group is identified as a co-cluster group, each node in the group is subsequently ineligible for inclusion in any other co-cluster group. In other words, each node can be a part of, at most, 1 co-cluster group.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
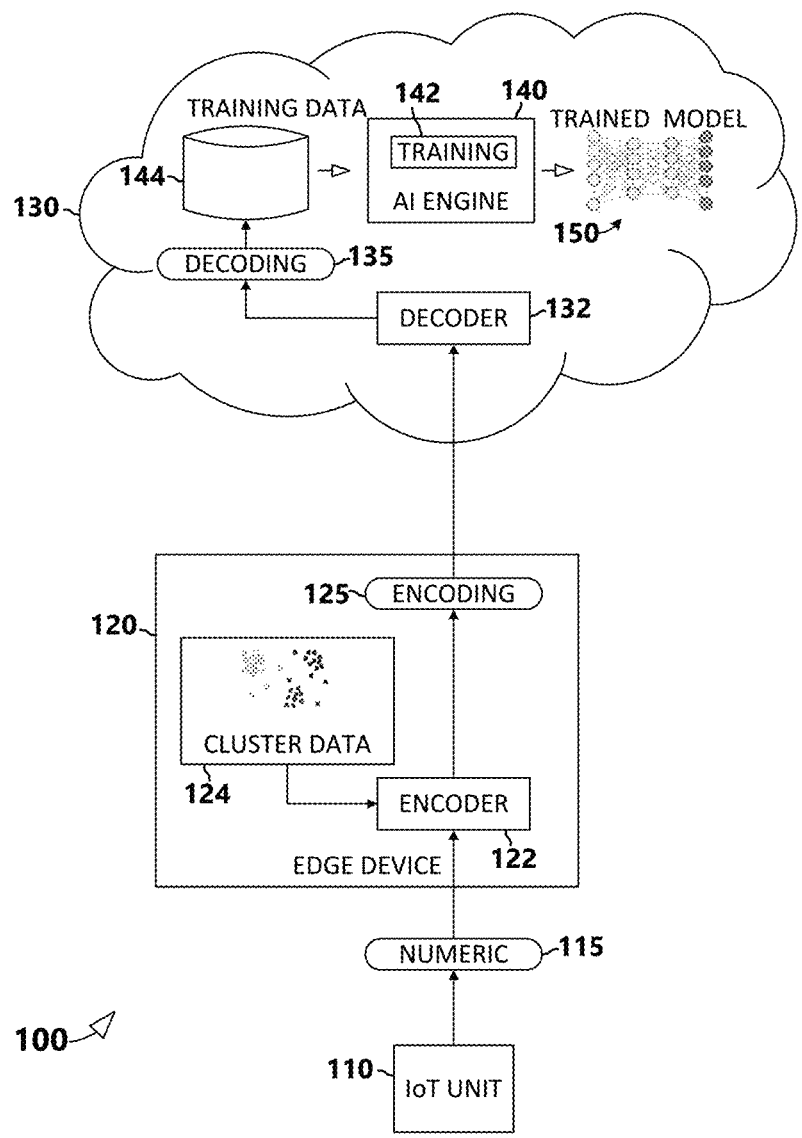
FIG. 1 illustrates an edge computing environment in accordance with a disclosed system for employing a lossy compression algorithm in conjunction with training an AI engine.

Exemplary embodiments and their advantages are best understood by reference to FIGS. 1-7, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 is a block diagram illustration of an information handling system 100 in accordance with a first aspect of disclosed subject matter. The information handling system 100 illustrated in FIG. 1 includes an IoT unit 110 communicatively coupled to an edge device 120. Edge device 120 is coupled to cloud computing resources 130. IoT unit 110 generates numeric information and transmits numeric data 115 to edge device 120. Edge device 120 includes an encoder 122 configured to receive numeric data 115 from IoT unit 110 and to generate a compressed encoding 125 of numeric data 115. The compressed encoding 125 is transmitted from edge device 120 to a decoder 132 within cloud computing resources 130. Decoder 132 produces a decoding 135 corresponding to the compressed encoding 125. Decoding 135 is provided to an AI resource 136.

In at least one embodiment, the encoder 122 illustrated in FIG. 1 is a cluster-based encoder that accesses and utilizes cluster data 124 to produce the compressed encoding 125. Edge device 120 may generate the clusters represented by cluster data 124 based on historical data using any of various clustering algorithms including, but not limited to, a k-means clustering algorithm. In embodiments employing a k-means clustering algorithm, encoder 122 may receive a value "n" as a hyperparameter indicating the number of clusters and a vector containing historical values generated by the IoT unit. Encoder 122 may then perform the k-means clustering algorithm on the historical data vector to determine the n clusters represented by cluster data 124.

Each of the clusters may be characterized by a mean value and a corresponding variance value. Cluster data 124, which represents all "n" of the clusters, may include a pair of n-dimensional vectors including a mean vector containing mean values for each of the "n" clusters and a variance vector containing variance values for each of the "n" clusters.

Encoder 122 may transmit cluster data 124 to decoder 132. In such embodiments, decoder 132 may generate decoding 135 by using the compressed encoding 125 to identify the cluster to which numeric data 122 was assigned by encoder 122 and then sampling the applicable cluster in accordance with the cluster's probability density characteristics. Encoder 122 may update cluster data periodically or from time to time in response to one or more specified criteria and/or events.

The cloud computing resource 130 illustrated in FIG. 1 includes, in addition to decoder 132, an AI engine 140 including a training module 142 and a training data database 144. Training module 142 is suitable for use in conjunction with AI engine 140 and training data 144 to produce a trained model 150 as will be appreciated by those of ordinary skill in the field of artificial intelligence.

Figure 2:
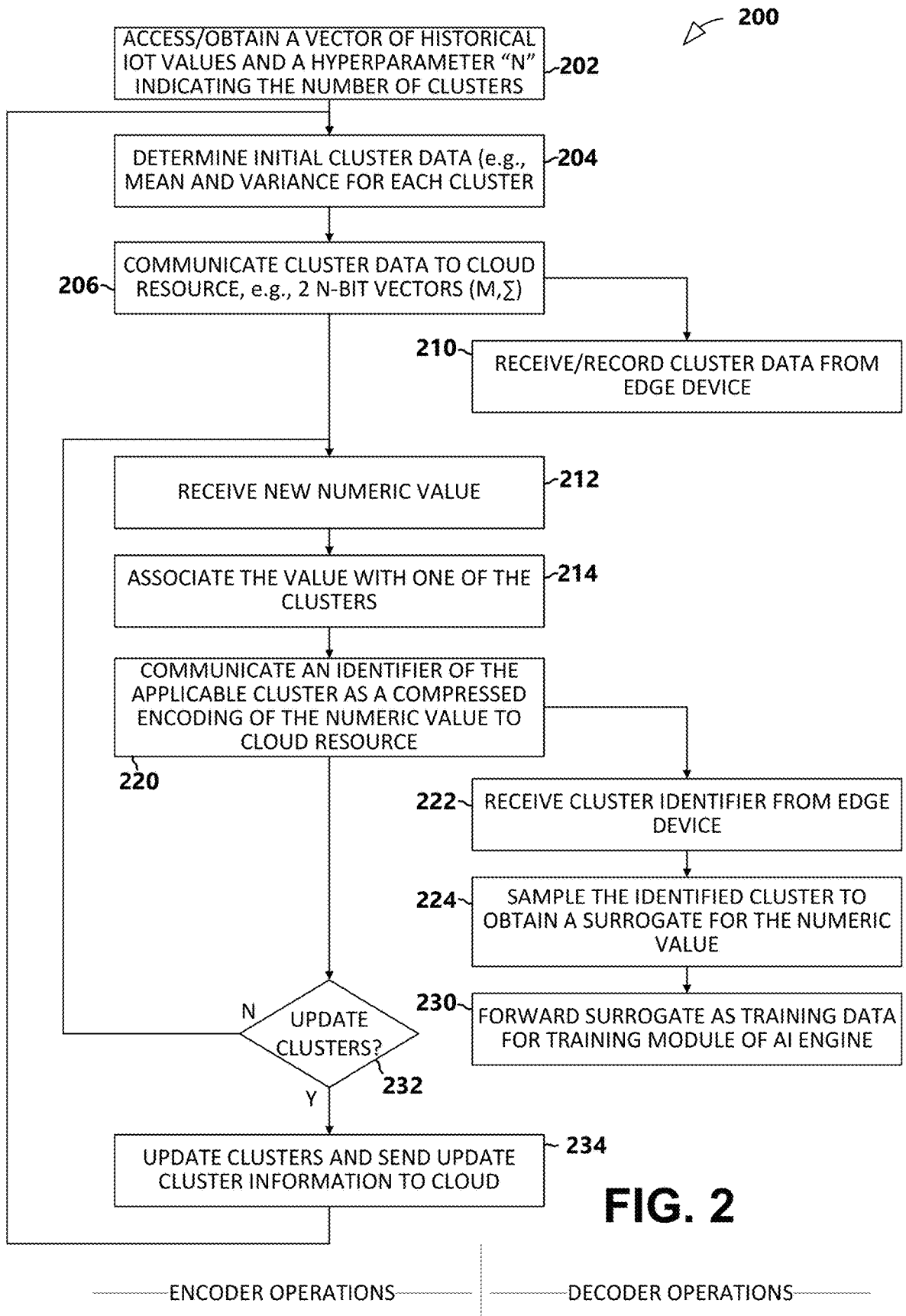
FIG. 2 illustrates a flow diagram of an AI training method.

Turning now to FIG. 2, a sequence diagram 200 illustrates a method of efficiently communicating training data from an edge device in accordance with a first aspect disclosed subject matter. The sequence diagram 200 illustrated in FIG. 2 includes a left column of operational blocks corresponding to actions performed by edge device 120 (FIG. 1) and a right column of operational blocks corresponding to actions performed by decoder 132 (FIG. 1).

As illustrated in FIG. 2, the edge device accesses or obtains (operation 202) a vector of historical numeric values generated by the IoT unit. The edge device is also provided with a hyperparameter "n", which indicates the number of clusters to be used by the clustering algorithm. The edge device then determines (operation 204) the cluster data 124 (FIG. 1) based on the historical numeric values and the number of clusters. The cluster data 124 may include two n-dimensional vectors of numeric values where the first vector includes a mean value for each cluster and the second vector includes a variance value, e.g., standard deviation, for each cluster. As illustrated in FIG. 2, the cluster data is communicated (operation 206) from the edge device to the cloud resource.

After establishing the clusters in blocks 202-210, the edge device then receives (operation 212) a new numeric value from the IoT unit and the clustering algorithm of the edge device determines (operations 214) which one of the clusters the numeric value should be assigned to. For example, in a k-means clustering algorithm, new values will be assigned to the cluster having a mean value closest to the numeric value.

As illustrated in sequence diagram 200, the encoder communicates (operation 220) an identifier of the applicable cluster, as a compressed encoding of the numeric value, to the decoder with the cloud computing resources. The decoder then receives (operation 222) the cluster identifier from the edge device and generates (operation 224) a sample of the identified cluster based on an underlying distribution of the cluster to obtain a surrogate for the numeric value generated by the IoT unit. The surrogate value may then be forwarded (operation 230) to the training module 142 (FIG. 1) of AI engine 140. In this manner, the encoder generates a compressed encoding of a numerical value received from the IoT unit, transmits the compressed encoding, rather than the numeric value itself, to the cloud computing resources, and then produces a surrogate for the numeric value by sampling the applicable cluster before forwarding the surrogate value to a training module of an AI engine.

After the encoder communicates the compressed identifier to the decoder in block 220, the encoder repeats the process beginning at block 212 when the encoder next receives a numeric value from the IoT unit. Periodically or from time to time (operation 232) in response to a specified criteria or event, the encoder may re-compute the clusters, update cluster information 124 accordingly and forward the updated cluster information to the decoder.

Figure 3:
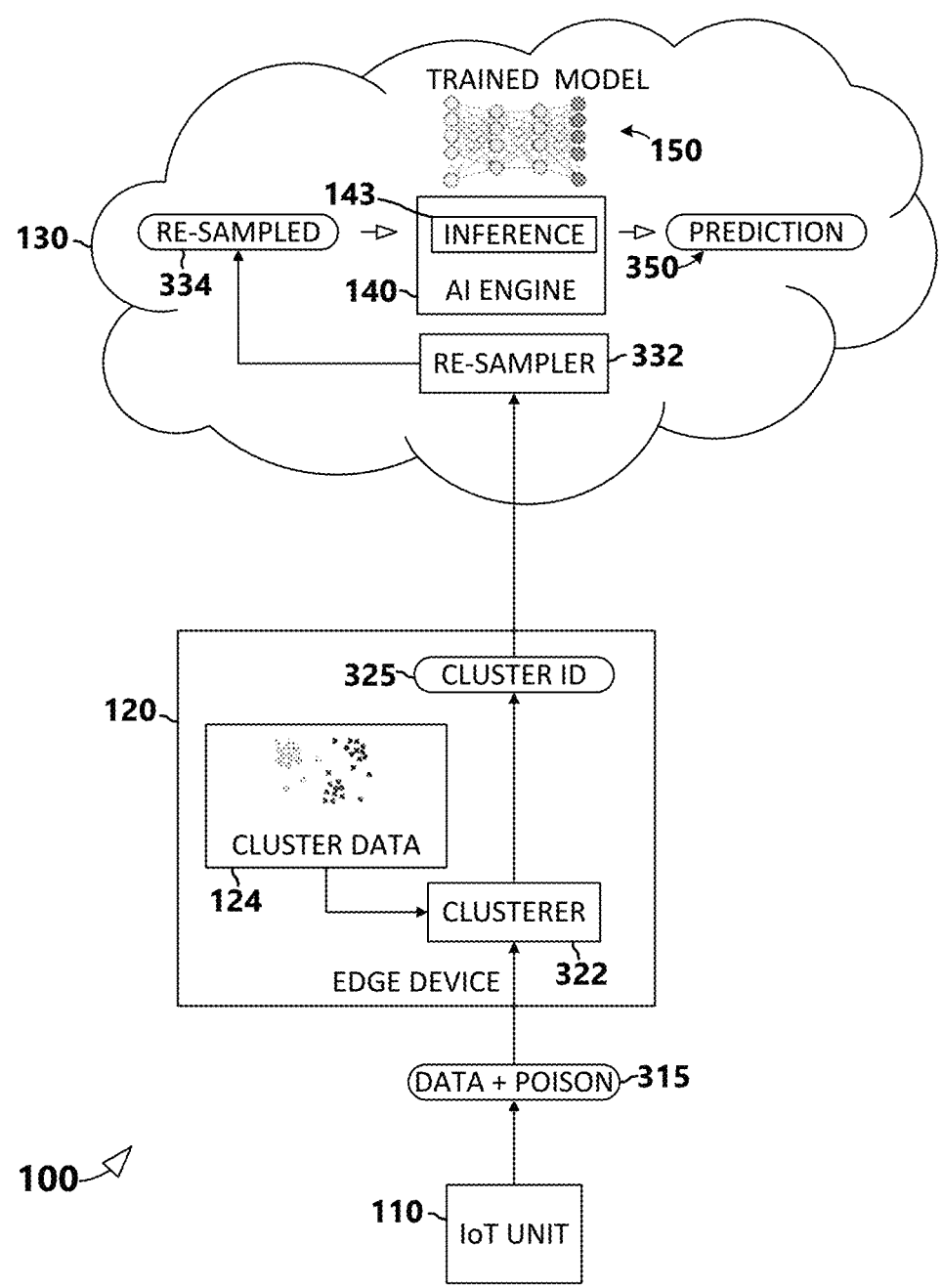
FIG. 3 illustrates an edge computing environment in accordance with a disclosed system for counteracting adversarial data injected into numeric values received from an IoT unit.
Figure 4:
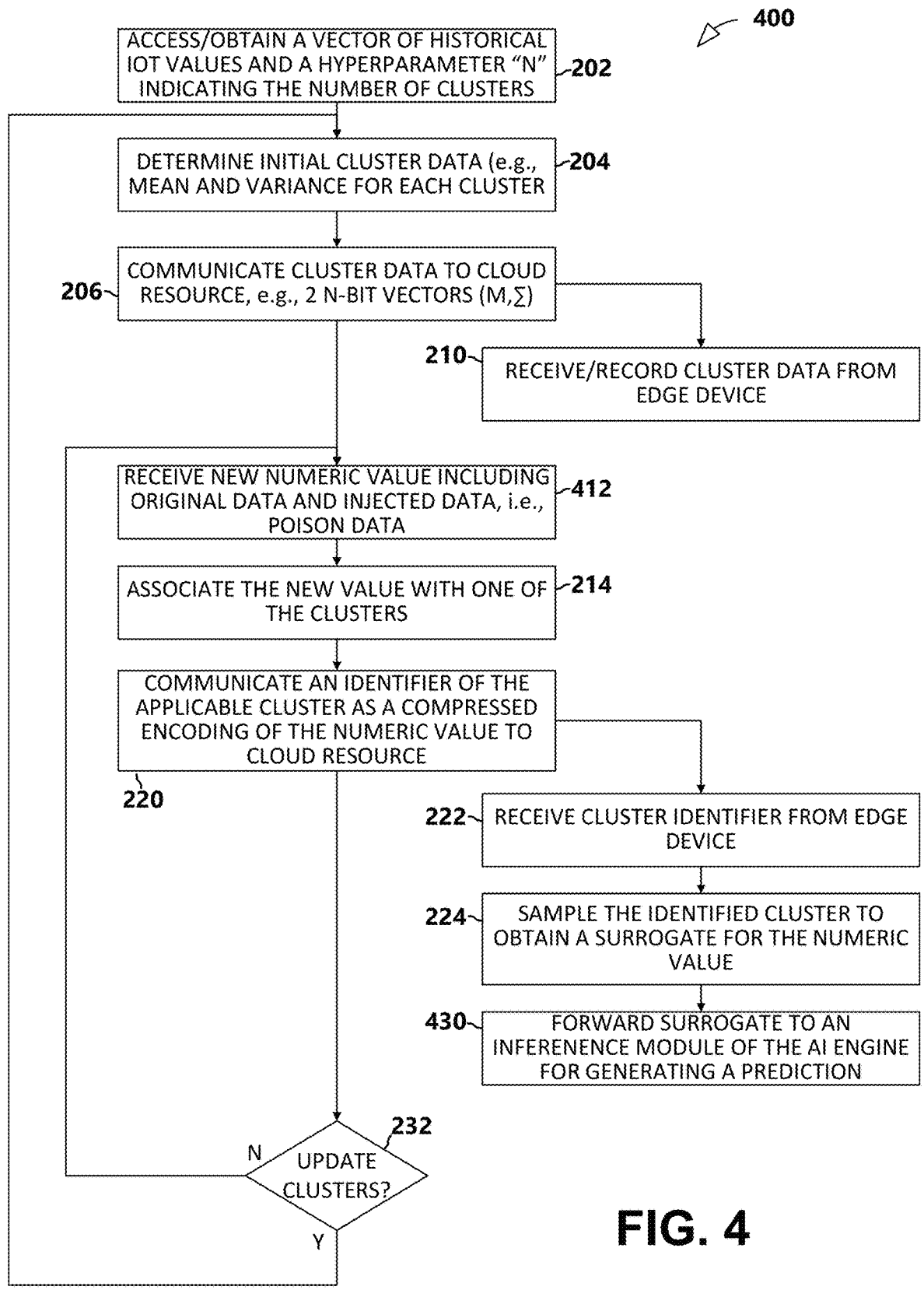
FIG. 4 illustrates a flow diagram of method for alleviating data poisoning on the edge.

Turning now to FIG. 3 and FIG. 4, a second aspect of disclosed edge computing systems and methods is illustrated. In this second aspect, the edge device may again perform a clustering algorithm to establish a plurality of "n" clusters based on a set of historic numeric values. In this second aspect, however, new values received by the edge device from the IoT unit from have been corrupted or poisoned, i.e., injected with adversarial data intended to subtlety but negatively influence the trained model of the AI engine. After the appropriate cluster for the numeric value, albeit a corrupted numeric value, is identified, a sample value from the cluster's underlying distribution is obtained and used as a surrogate for the corrupted numeric value. This surrogate value, which is free of the adversarial data injected into the numeric value received from the IoT unit, is provided to an AI engine that will draw an inference based on the surrogate value. By using the corrupted numeric value only to identify the appropriate cluster from which to draw an un-corrupted surrogate for the corrupted value, the adversarial data prevented from influencing the AI engine and the corresponding trained model.

FIGS. 3 and 4 share similarities with FIGS. 1 and 2 respectively. For the sake of brevity the following description emphasize the elements of FIG. 3 that differ from FIG. 1 and the elements of FIG. 4 that differ from FIG. 2.

Turning to FIG. 3, edge device 120 includes a clusterer 322, which calculates the cluster information 124 in the same manner as encoder 122 (FIG. 1). Clusterer 322 receives poisoned numeric data 315, i.e., data that original data from the IoT unit plus injected adversarial data. The poisoning of data 315 is presumably too subtle to be detected as an anomaly and therefore, when the numeric data 315 is evaluated by clusterer 322, the clusterer identifies the same cluster as it would have identified for the same numeric value without the poison. The cluster identifier 325, which is analogous to the compressed encoding 125 of FIG. 1, is forwarded to the cloud.

The cloud resources 130 illustrated in FIG. 3 includes a re-sampler 332 that receives cluster identifier 325 and generates resampled data 334 based on the probability density characteristics of the identified cluster analogous to the manner in which decoder 132 (FIG. 1) generates decoding 135 based on compressed encoding 125. The resampled data 334 is then provided to an inference module 143 of AI engine 140. It will be appreciated that resampled data 334 is a surrogate for poisoned numeric data 315 in the same way that decoding 135 (FIG. 1) is a surrogate for numeric data 115. In this case, however, the resampling achieves the additionally beneficial result of effectively preventing the poisoned data from reaching the AI engine. FIG. 3 further illustrates that the resampled data 143 is used to draw an inference and make a prediction 350. These elements contrast with the elements for AI training emphasized in FIG. 1.

Turning now to FIG. 4, elements of the illustrated sequence diagram 400 for alleviating poisoned data in an edge computing environment that are similar to corresponding elements of the sequence diagram 200 illustrated in FIG. 2 are represented with the same 2XX reference numerals whereas the elements of sequence diagram 400 that differ from elements in sequence diagram 200 include a 4XX reference numeral.

The method 400 illustrated in FIG. 4 includes essentially the same operations 202 through 210 for establishing a group of n clusters in accordance with a clustering algorithm and a set of historical numerical values that are illustrated and described in blocks 202 through 210 of FIG. 2.

The illustrated method 400 includes block 412, in which the clusterer 322 (FIG. 3) receives a poisoned numeric data 315 from the IoT unit 110 wherein the poisoned numeric value 315 includes original data plus injected data or poisoned data as previously discussed. The illustrated method 400 identifies (operation 214) the cluster to which the applicable clustering algorithm is assigned analogous to the operation of block 214 of FIG. 2. Again, however, the poisoning of the data from the IoT unit may be too subtle to be detected as anomaly or to alter the cluster assignment.

For purposes of preventing the poisoned data from reaching the AI unit 140 and potentially and detrimentally altering the corresponding trained model 150, resampled data 334 is obtained by re-sampler 332 as a surrogate for poisoned numeric data 315. Resampled data 334 is then provided, in lieu of the poised numeric data 315 value received from the IoT unit, to an inference module 143 of the AI engine. In some embodiments, including the embodiment of method 400 illustrated in FIG. 4, the resampler 332 is implemented as a cloud computing resource while in other embodiments, the resampler may reside on the edge device.

For the embodiment illustrated in FIG. 4, in which the resampler 332 of FIG. 3 is located in the cloud, the illustrated method includes the resampler receiving (operation 222) the cluster identifier 325 from clusterer 322. Resampler 334 may then generate a sample (operation 224) from the identified cluster based on the cluster's underlying distribution and the sample may then be provided (operation 430) to an inference module of the AI engine 140 (FIG. 1).

Figure 5:
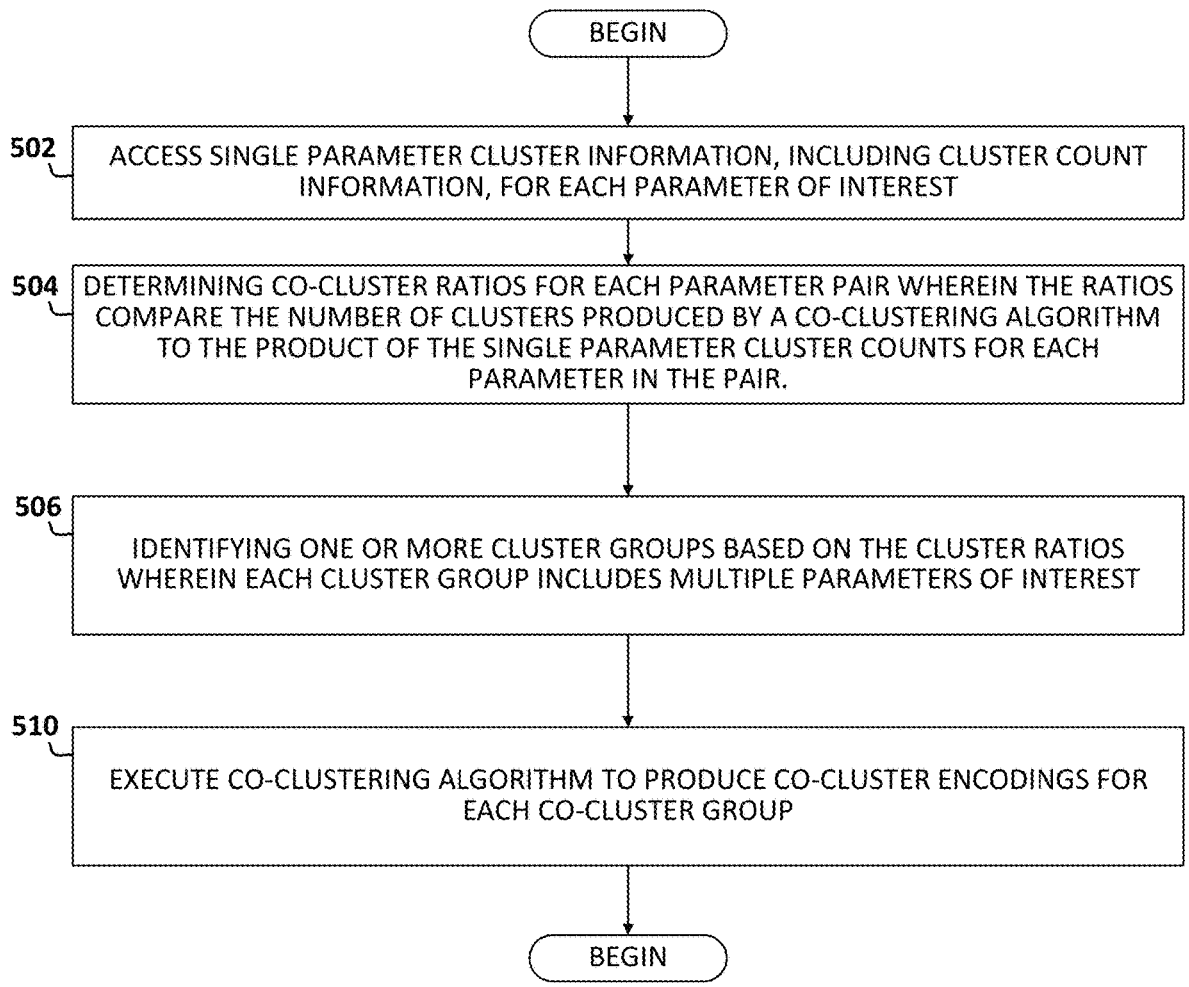
FIG. 5 illustrates a flow diagram for employing co-clustering to improve the efficiency of the method illustrated in FIG. 2.

Turning now to FIG. 5, efficiencies achieved using the compressed encodings disclosed in the preceding description of FIG. 1 and FIG. 2 may be extended through the use of co-clustering, i.e., clusters determined based on numeric value tuples that include a numeric value for each of two or more parameters of interest. For the sake of clarity and brevity, the following description uses at least some examples in which two-parameter co-clustering is considered. Extensions to co-clustering for three or more parameters will be apparent to those of ordinary skill having the benefit of this disclosure.

Generally, a co-clustering algorithm may be employed to define clusters from an arbitrary set of data points associated with two or more parameters of interest. In at least some embodiments, the co-clustering algorithm may be, or may be based on, a widely known and readily available clustering algorithm such as a density based spatial clustering of applications with noise (DBSCAN) algorithm. In at least some instances involving 2-parameter co-clustering, such a co-clustering algorithm may be applied to numeric value tuples that include numeric values for a pair of parameters, including a first parameter and a second parameter. In at least some implementations, it is assumed that a single-parameter clustering of both parameters has been performed, as described above with respect to FIG. 1 and FIG. 2, and that the number of clusters, i.e., the cluster count, is known for each of the parameters.

If C1 is the cluster count associated with a single parameter clustering of the first parameter and C2 is the cluster count associated with the second parameter, then the total number of cluster pairs associated with the first and second parameters is the product of C1 and C2, i.e., C1*C2. Thus, if a single-parameter clustering of a first parameter includes 5 clusters and a single-parameter clustering of a second parameter includes 6 clusters, then there are 5*6 or 30 unique cluster-pairs with which any tuple of first and second parameter values might be associated. Additional compression efficiency might be achieved via co-clustering if a co-clustering algorithm generates less than 30 clusters for the same pair of parameters.

Turning now to FIG. 5, a flow diagram illustrates a method 500 in accordance with disclosed teachings for employing co-clustering to reduce the amount of data transferred between edge and cloud resources. The method 500 illustrated in FIG. 5 includes accessing (operation 502) single-parameter cluster information for each parameter of interest. The single-parameter cluster information is consistent with the cluster information described with respect to FIG. 1 and FIG. 2. The cluster information for each single-parameter clustering includes a cluster count indicating the number of clusters in the clustering. As discussed above with respect to a k-means clustering algorithm, the number of clusters may, in at least some embodiments, be specified by the user.

The method 500 illustrated in FIG. 5 then determines (operation 504) cluster ratios for each unique parameter pair. Qualitatively, the cluster ratios indicate whether the use of co-clustering is capable of reducing the amount of data sent between edge and cloud resources relative to the previously described single-parameter clustering. As suggested previously, in at least one embodiment, the cluster ratio for a parameter pair in which the single-parameter clustering of the first parameter includes C1 clusters and the single-parameter clustering of the second parameter includes C2 clusters, is equal to (C1*C2)/CC, where CC is the cluster count for the co-clustering algorithm.

Cluster ratios exceeding 1 indicate that co-clustering may be suitably employed to reduce the amount of edge-to-cloud data transferred. In some embodiments, it may be desirable to use a threshold cluster ratio that is greater than 1 to ensure that co-clustering is employed only when the expected reduction in data transfer is appreciable. To illustrate, continuing with the previous example with 30 unique pairs of single-parameter clusters for two parameters of interest, if the cluster count for the co-clustering algorithm is 29, then the cluster ratio for this parameter pair is 30/29 and the comparatively small reduction in cluster count may not justify any additional processing required to determine the co-clusters. Thus, the threshold cluster ratio used in a given implementation may be greater than 1, e.g., 1.25 or higher.

The method 500 OF FIG. 5 further includes identifying (operation 506) one or more cluster groups based on the cluster ratios. In at least one embodiment, a threshold cluster ratio may be set and all parameters pairs with a cluster ratio equal to or greater than the threshold value may be evaluated as co-cluster group candidates, while parameter pairs with a cluster ratio below the threshold value may be discarded as co-cluster group candidates.

After identifying one or more co-cluster groups, the illustrated method may then execute (operation 510) the co-clustering algorithm for numeric value tuples corresponding to one of the identified co-cluster group to determine which cluster the tuple is assigned. An n-bit integer identifier of the assigned cluster may then be used as the encoding for the numeric value tuple. The encoding may then be transmitted from edge to cloud.

Figure 6:
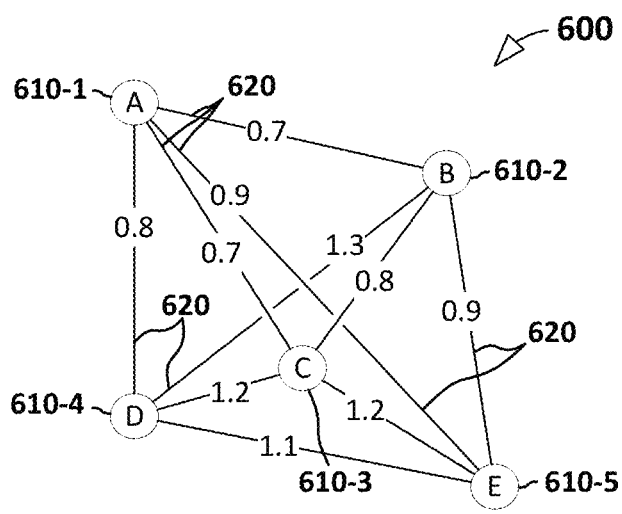
FIG. 6 illustrates a node and edge graph suitable for determining co-cluster groups in a methodical fashion.

FIG. 6 illustrates a graph 600, referred to herein as node and edge graph 600 including five nodes 610 (610-1 through 610-5) and an edge 620 connecting each pair of nodes 610. Each node 610 represents a parameter of interest and each edge 620 represents a parameter pair, comprised of the parameters associated with the nodes 610 at each end of the edge. Each edge 620 has been labeled with its corresponding cluster ratio value.

A cluster ratio exceeding the value 1 indicates that co-clustering the two parameters may reduce the number of clusters required to represent numeric values for the applicable parameters. A smaller number of required clusters potentially reduces the amount of data required to encode the numeric value tuples and, therefore, reduces the amount of data transmitted between the edge devices and the cloud based resources.

Figure 7:
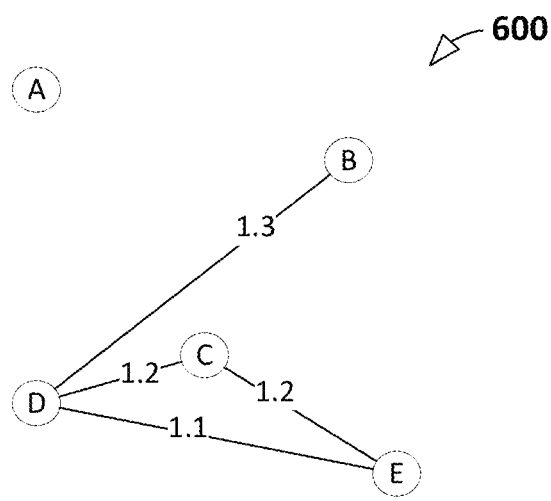
FIG. 7 illustrates the node and edge graph of FIG. 6 as modified to eliminate, based on a cluster ratio parameter, certain edges from co-clustering consideration.

FIG. 7 illustrates the graph 600 of FIG. 6, modified by removing all edges 620 with a cluster ratio less than 1. In other embodiments, the threshold value for removing edges 620 may be greater than or less than 1. In this case, the remaining edges identify parameter pairs that could be co-clustered to improve the encoding efficiency by reducing the number of clusters used to represent the data.

Co-clustering may be performed based on an assessment of the modified graph illustrated in FIG. 7 based on a set of rules or method steps. To illustrate, a co-clustering determination process may be subject to a rule that each node is associated with, at most, one co-cluster group. In this example, after a node 610 has been assigned to a co-cluster group, the node may be effectively removed from the graph.

In some embodiments, co-clustering may be determined based, at least in part, on maximal cliques defined by the graph of FIG. 7. In the field of graph theory, a clique is any subset of nodes 610 in which every pair of nodes within the subset are adjacent, i.e., are connected by an edge 620. A maximal clique refers to a clique that cannot be extended by the addition of another node. FIG. 7 illustrates a graph with two maximal cliques, including a first maximal clique defined by nodes D, B and a second maximal clique defined by nodes C, D, and E. Because the number of nodes in the second maximal clique is greater than the number of nodes in the first maximal clique, the second maximal clique is referred to as a maximum clique, i.e., a clique in which the number of nodes is greater than or equal to the number of nodes in every other clique.

For embodiments that are not constrained to two parameter co-clustering, the co-cluster group determination process may begin by using the nodes associated with a maximum clique as a first co-cluster group. If there are two or more maximum cliques, the determination of which maximum clique to use as the first co-cluster group may be determined based on some formula pertaining to the cluster ratios. In the case of two or more 2-node maximal cliques, the maximal clique with the highest cluster ratio may be the first co-cluster group chosen. Some embodiments may limit the number of co-cluster groups to 1 or another number.

Once a co-cluster group is identified, then the method may remove the corresponding nodes from further co-clustering consideration. Applying this method to the modified graph of FIG. 7, the nodes of the second clique (DCE), as the sole maximum clique, are defined as the first co-cluster group. After removing these three nodes from further consideration, no other co-cluster groups would be defined because the only remaining nodes, nodes A and B, do not define a clique (ignoring 1-node cliques). In this case, single-parameter clusters for nodes A and B will be used along with a co-cluster encompassing nodes C, D, and E to convey the encoding of numeric values for these five parameters.

In embodiments that constrain the number of nodes in any co-cluster group to 2, the co-cluster group determination process may identify all cliques defined by two nodes. Referring again to the modified graph of FIG. 7, there would be four candidate co-cluster groups including co-cluster groups associated with cliques (DB), (DC), (DE), and (CE). The candidate co-cluster groups may then be ranked based upon one or more predetermined criteria. In at least one embodiment, the cluster ratio values may be used to rank the candidates. In the case of FIG. 7, because nodes D and B would be the highest rank 2-node clique based on cluster ratios, nodes D and B would be identified as the first co-cluster group. After removing nodes D and B from further consideration, the clique (CE) would be the only remaining 2-node clique, in which case nodes C and E might be identified as a second co-cluster group. In this example, the encoding of numeric values would be based on a single-parameter clustering of node A values, a first 2-node co-clustering of nodes D and B, and a second 2-node clustering of clustering of nodes C and E.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
    accessing single-parameter cluster information for each of two or more parameters of interest, wherein each parameter of interest corresponds to a time series of numeric values sent from one or more internet of things (IoT) units to an edge device, wherein the single-parameter cluster information for each parameter of interest indicates a single-parameter cluster count for the parameter of interest;
    determining a co-clustering ratio for each pair of the two or more parameters of interest, wherein each pair includes a first parameter and a second parameter and wherein the co-clustering ratio indicates whether the number of clusters produced by a co-clustering algorithm applied to the first and second parameters is less than the product of the single-parameter cluster counts for the first and second parameters;
    identifying one or more co-cluster groups based on the cluster ratios, wherein each co-cluster group includes two or more of the parameters of interest;
    for each of the one or more co-cluster groups, employing the co-clustering algorithm to produce compressed co-clustered encodings of the tuples; and
    transmitting the compressed co-clustered encodings of the tuples to a cloud computing resource;
    responsive to receiving, by a decoder, the compressed co-clustered encodings, generating surrogates for the tuples in accordance with a probability distribution applicable to the particular parameter pair; and
    providing the surrogates as training data for an artificial intelligence engine of the cloud computing resource.

2. The method of claim 1, wherein the co-clustering algorithm assigns each tuple associated with a co-cluster group to one of a plurality of clusters for the co-cluster group and wherein the compressed encodings comprise an identifier of the cluster.

3. The method of claim 2, wherein the co-clustering algorithm comprises a density based spatial cluster application with noise (DBSCAN) algorithm.

4. The method of claim 2, wherein identifying the co-cluster groups includes:
    accessing a node and edge graph associated with the parameters of interest, wherein the node and edge graph includes a node corresponding to each parameter of interest and an edge between each pair of nodes;
    assigning a cluster ratio to each edge, wherein the cluster ratio indicates a ratio of cluster combinations for nodes at each end of the edge to co-clusters determined by a co-clustering algorithm for the nodes at each end of the edge.

5. The method of claim 4, further comprising:
    modifying the node and edge graph by removing edges with a cluster ratio below a particular threshold ratio.

6. The method of claim 5, further comprising:
    identifying one or more maximal cliques in the node and edge graph, wherein node groups corresponding to each maximal clique are candidates for co-clustering.

7. The method of claim 6, further comprising:
    responsive to selecting a candidate node group for co-clustering, removing the nodes of the node from further consideration and evaluating remaining nodes and edges for one or more additional node groups.

8. A non-transitory computer readable medium, including process executable program instructions that, when executed by a processor of an information handling system, cause the system to perform operations comprising:
    accessing single-parameter cluster information for each of two or more parameters of interest, wherein each parameter of interest corresponds to a time series of numeric values sent from one or more internet of things (IoT) units to an edge device, wherein the single-parameter cluster information for each parameter of interest indicates a single-parameter cluster count for the parameter of interest;
    determining a co-clustering ratio for each pair of the two or more parameters of interest, wherein each pair includes a first parameter and a second parameter and wherein the co-clustering ratio indicates whether the number of clusters produced by a co-clustering algorithm applied to the first and second parameters is less than the product of the single-parameter cluster counts for the first and second parameters;
    identifying one or more co-cluster groups based on the cluster ratios, wherein each co-cluster group includes two or more of the parameters of interest;
    for each of the one or more co-cluster groups, employing the co-clustering algorithm to produce compressed co-clustered encodings of the tuples; and
    transmitting the compressed co-clustered encodings of the tuples to a cloud computing resource;
    responsive to receiving, by a decoder, the compressed co-clustered encodings, generating surrogates for the tuples in accordance with a probability distribution applicable to the particular parameter pair; and
    providing the surrogates as training data for an artificial intelligence engine of the cloud computing resource.

9. The non-transitory computer readable medium of claim 8, wherein the co-clustering algorithm assigns each tuple associated with a co-cluster group to one of a plurality of clusters for the co-cluster group and wherein the compressed encodings comprise an identifier of the cluster.

10. The non-transitory computer readable medium of claim 9, wherein the co-clustering algorithm comprises a density based spatial cluster application with noise (DBSCAN) algorithm.

11. The non-transitory computer readable medium of claim 9, wherein identifying the co-cluster groups includes:
    accessing a node and edge graph associated with the parameters of interest, wherein the node and edge graph includes a node corresponding to each parameter of interest and an edge between each pair of nodes;
    assigning a cluster ratio to each edge, wherein the cluster ratio indicates a ratio of cluster combinations for nodes at each end of the edge to co-clusters determined by a co-clustering algorithm for the nodes at each end of the edge.

12. The non-transitory computer readable medium of claim 11, further comprising:
    modifying the node and edge graph by removing edges with a cluster ratio below a particular threshold ratio.

13. The non-transitory computer readable medium of claim 12, further comprising:
    identifying one or more maximal cliques in the node and edge graph, wherein node groups corresponding to each maximal clique are candidates for co-clustering.

14. The non-transitory computer readable medium of claim 13, further comprising:
    responsive to selecting a candidate node group for co-clustering, removing the nodes of the node from further consideration and evaluating remaining nodes and edges for one or more additional node groups.

15. An information handling system, comprising:
    a central processing unit (CPU); and
    a memory, accessible to the CPU, including processor executable program instructions that, when executed by the processor, cause the system to perform operations including:
        accessing single-parameter cluster information for each of two or more parameters of interest, wherein each parameter of interest corresponds to a time series of numeric values sent from one or more internet of things (IoT) units to an edge device, wherein the single-parameter cluster information for each parameter of interest indicates a single-parameter cluster count for the parameter of interest;
        determining a co-clustering ratio for each pair of the two or more parameters of interest, wherein each pair includes a first parameter and a second parameter and wherein the co-clustering ratio indicates whether the number of clusters produced by a co-clustering algorithm applied to the first and second parameters is less than the product of the single-parameter cluster counts for the first and second parameters;
        identifying one or more co-cluster groups based on the cluster ratios, wherein each co-cluster group includes two or more of the parameters of interest;
        for each of the one or more co-cluster groups, employing the co-clustering algorithm to produce compressed co-clustered encodings of the tuples; and
        transmitting the compressed co-clustered encodings of the tuples to a cloud computing resource;
        responsive to receiving, by a decoder, the compressed co-clustered encodings, generating surrogates for the tuples in accordance with a probability distribution applicable to the particular parameter pair; and
        providing the surrogates as training data for an artificial intelligence engine of the cloud computing resource.

16. The information handling system of claim 15, wherein the co-clustering algorithm assigns each tuple associated with a co-cluster group to one of a plurality of clusters for the co-cluster group and wherein the compressed encodings comprise an identifier of the cluster.

17. The information handling system of claim 16, wherein the co-clustering algorithm comprises a density based spatial cluster application with noise (DBSCAN) algorithm.

18. The information handling system of claim 16, wherein identifying the co-cluster groups includes:
    accessing a node and edge graph associated with the parameters of interest, wherein the node and edge graph includes a node corresponding to each parameter of interest and an edge between each pair of nodes;
    assigning a cluster ratio to each edge, wherein the cluster ratio indicates a ratio of cluster combinations for nodes at each end of the edge to co-clusters determined by a co-clustering algorithm for the nodes at each end of the edge.

19. The information handling system of claim 18, wherein the operations further comprise:
    modifying the node and edge graph by removing edges with a cluster ratio below a particular threshold ratio.

20. The information handling system of claim 19, wherein the operations further comprise:
    identifying one or more maximal cliques in the node and edge graph, wherein node groups corresponding to each maximal clique are candidates for co-clustering.

* * * * *